US006862668B2

(12) United States Patent
McKean et al.

(10) Patent No.: US 6,862,668 B2
(45) Date of Patent: Mar. 1, 2005

(54) METHOD AND APPARATUS FOR USING CACHE COHERENCY LOCKING TO FACILITATE ON-LINE VOLUME EXPANSION IN A MULTI-CONTROLLER STORAGE SYSTEM

(75) Inventors: Brian Dennis McKean, Longmont, CO (US); Randall Alan Pare, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 10/084,404

(22) Filed: Feb. 25, 2002

(65) Prior Publication Data

US 2003/0163655 A1 Aug. 28, 2003

(51) Int. Cl.[7] ............................................... G06F 12/00
(52) U.S. Cl. ........................ 711/154; 711/114; 711/141; 711/152; 711/161; 711/162; 711/163; 710/2; 710/200; 709/208; 709/209; 709/210; 709/211; 707/8; 707/201; 707/202; 707/203; 707/204
(58) Field of Search .................................. 711/114, 141, 711/152, 154, 161, 162, 163; 710/2, 200; 709/208, 209, 210, 211; 707/8, 201, 202, 203, 204

(56) References Cited

U.S. PATENT DOCUMENTS

| | | | |
|---|---|---|---|
| 4,638,424 A | 1/1987 | Beglin et al. | |
| 4,771,375 A | 9/1988 | Beglin et al. | |
| 5,056,015 A | 10/1991 | Baldwin et al. | |
| 5,247,660 A | 9/1993 | Ashcraft et al. | |
| 5,410,697 A | 4/1995 | Baird et al. | |
| 5,493,668 A | 2/1996 | Elko et al. | |
| 5,537,574 A | 7/1996 | Elko et al. | |
| 5,634,072 A | 5/1997 | Allen et al. | |
| 5,742,792 A | 4/1998 | Yanai et al. | |
| 5,787,243 A | 7/1998 | Stiffler et al. | |
| 5,809,224 A * | 9/1998 | Schultz et al. | 714/7 |
| 5,860,159 A | 1/1999 | Hagersten | |
| 5,864,657 A | 1/1999 | Stiffler et al. | |
| 5,875,457 A | 2/1999 | Shalit | |
| 5,909,540 A | 6/1999 | Carter et al. | |
| 5,983,326 A | 11/1999 | Hagersten et al. | |
| 5,999,930 A | 12/1999 | Wolff | |
| 6,041,400 A | 3/2000 | Ozcelik et al. | |
| 6,058,489 A * | 5/2000 | Schultz et al. | 714/7 |
| 6,073,218 A | 6/2000 | DeKoning et al. | |
| 6,078,990 A | 6/2000 | Frazier | |
| 6,119,115 A | 9/2000 | Barr | |
| 6,499,039 B1 * | 12/2002 | Venkatesh et al. | 707/204 |

\* cited by examiner

Primary Examiner—Donald Sparks
Assistant Examiner—Baq Q Truong

(57) ABSTRACT

The present invention provides a method and apparatus for using cache coherency locking to facilitate on-line volume expansion in a multi-controller storage device. A volume set is divided into segments by a first controller. The first controller acquires a cache lock for one of the segments of the volume set to be expanded. A second controller is provided access to any non-cache-locked segments of data during the expansion while safeguarding integrity of the segment undergoing expansion. The first controller also provides the second controller information regarding the expansion so that the second controller may, in the event the first controller fails, perform the expansion using a backup copy of the segment being expanded.

12 Claims, 9 Drawing Sheets

| EXPANSION SECTION | DISK 1 | DISK 2 | DISK 3 | DISK 4 | DISK 5 (NEW DISK) | DISK 6 (NEW DISK) |
|---|---|---|---|---|---|---|
| 1 | 1 | 2 | 3 | P1 | | |
| 2 | 4 | 5 | P2 | 6 | | |
| 3 | 7 | P3 | 8 | 9 | | |
| 4 | P4 | 10 | 11 | 12 | | |
| 5 | 13 | 14 | 15 | P5 | | |
| 6 | 16 | 17 | P6 | 18 | | |
| 7 | 19 | P7 | 20 | 21 | | |
| 8 | P8 | 22 | 23 | 24 | | |
| 9 | 25 | 26 | 27 | P9 | | |
| 10 | 28 | 29 | P10 | 30 | | |

Fig. 6a

| EXPANSION SECTION | DISK 1 | DISK 2 | DISK 3 | DISK 4 | DISK 5 (NEW DISK) | DISK 6 (NEW DISK) |
|---|---|---|---|---|---|---|
| 1 | 1 | 2 | 3 | P1->4 | ->5 | ->P1' |
| 2 | 4 | 5 | P2 | 6 | | |
| 3 | 7 | P3 | 8 | 9 | | |
| 4 | P4 | 10 | 11 | 12 | | |
| 5 | 13 | 14 | 15 | P5 | | |
| 6 | 16 | 17 | P6 | 18 | | |
| 7 | 19 | P7 | 20 | 21 | | |
| 8 | P8 | 22 | 23 | 24 | | |
| 9 | 25 | 26 | 27 | P9 | 3 | P1 |
| 10 | 28 | 29 | P10 | 30 | 1 | 2 |

| EXPANSION SECTION | DISK 1 | DISK 2 | DISK 3 | DISK 4 | DISK 5 (NEW DISK) | DISK 6 (NEW DISK) |
|---|---|---|---|---|---|---|
| 1 | 1 | 2 | 3 | 4 | 5 | P1' |
| 2 | 4->6 | 5->7 | P2->8 | 6->9 | ->P2' | ->10 |
| 3 | 7 | P3 | 8 | 9 | | |
| 4 | P4 | 10 | 11 | 12 | | |
| 5 | 13 | 14 | 15 | P5 | | |
| 6 | 16 | 17 | P6 | 18 | | |
| 7 | 19 | P7 | 20 | 21 | | |
| 8 | P8 | 22 | 23 | 24 | P2 | 6 |
| 9 | 25 | 26 | 27 | P9 | 4 | 5 |
| 10 | 28 | 29 | P10 | 30 | | |

Fig. 6d

| EXPANSION SECTION | DISK 1 | DISK 2 | DISK 3 | DISK 4 | DISK 5 (NEW DISK) | DISK 6 (NEW DISK) |
|---|---|---|---|---|---|---|
| 1 | 1 | 2 | 3 | 4 | 5 | P1' |
| 2 | 6 | 7 | 8 | 9 | P2' | 10 |
| 3 | 7->11 | P3->12 | 8->13 | 9->P3' | ->14 | ->15 |
| 4 | P4 | 10 | 11 | 12 | | |
| 5 | 13 | 14 | 15 | P5 | | |
| 6 | 16 | 17 | P6 | 18 | | |
| 7 | 19 | P7 | 20 | 21 | | |
| 8 | P8 | 22 | 23 | 24 | | |
| 9 | 25 | 26 | 27 | P9 | | |
| 10 | 28 | 29 | P10 | 30 | | |

METHOD AND APPARATUS FOR USING CACHE COHERENCY LOCKING TO FACILITATE ON-LINE VOLUME EXPANSION IN A MULTI-CONTROLLER STORAGE SYSTEM

CROSS REFERENCE TO RELATED APPLICATION

This application is related to the following co-pending and commonly-assigned U.S. Patent Application, which is hereby incorporated herein by reference in their respective entirety:

METHOD AND APPARATUS FOR COOPERATIVE DISTRIBUTED TASK MANAGEMENT IN A STORAGE SUBSYSTEM WITH MULTIPLE CONTROLLERS USING CACHE LOCKING" to Pare et al., having U.S. patent application Ser. No. 10/084,214.

BACKGROUND OF THE INVENTION

1. Field of the Invention

This invention relates in general to mass storage systems, and more particularly to a method and apparatus for using cache coherency locking to facilitate on-line volume expansion in a multi-controller storage system.

2. Description of Related Art

Typically, a computer stores data within storage devices such as hard disk drives, floppy drives, tape, compact disk, etc. Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems. If a large amount of data requires storage, then multiple devices are connected to the computing system and utilized to store the data.

A popular solution to mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled A Case for Redundant Arrays of Inexpensive Disks (RAID), reviews the fundamental concepts of RAID technology.

There are five "levels" of standard geometries defined in the Patterson publication. The simplest array, a RAID 1 system, comprises one or more disks for storing data and a number of additional "mirror" disks for storing copies of the information written to the data disks. The remaining RAID levels, identified as RAID 2, 3, 4 and 5 systems, segment the data into portions for storage across several data disks. One of more additional disks are utilized to store error check or parity information.

A computing system typically does not require knowledge of the number of storage devices that are being utilized to store the data because another device, the storage subsystem controller, is utilized to control the transfer of data to and from the computing system to the storage devices. The storage subsystem controller and the storage devices are typically called a storage subsystem and the computing system is usually called the host because the computing system initiates requests for data from the storage devices. The storage controller directs data traffic from the host system to one or more non-volatile storage devices. The storage controller may or may not have an intermediate cache to stage data between the non-volatile storage device and the host system.

A caching storage controller is a device which is capable of directing the data traffic from a host system to one or more non-volatile storage devices which uses an intermediate data storage device (a cache memory) to stage data between the non-volatile storage device and the host system. In general, the intermediate storage device includes RAM to allow a quicker access time to the data. Furthermore, it provides a buffer in which to allow exclusive-or (XOR) operations to be completed for RAID 5 operations.

A multi-controller system is defined as a collection of controllers or caching storage controllers which work in a cooperative manner with each other. They provide the ability for recovering from a controller failure by allowing multiple paths to a volume set. The volume set is a contiguous range of randomly accessible sectors of data. For practical purposes, the sector numbering typically starts at 0 and goes to N, where N is the total number of sectors available to the host system. A data extent is a range of data within a volume set delineated by a starting sector and an ending sector. The volume set is broken up into a number of data extents which are not required to be of the equivalent sizes, but may not overlap. These concepts are used in the discussion of the background and the detailed description of embodiments of the invention, and apply to both.

Existing storage system control methodologies include incidental tasks that operate on user data, e.g., rebuilding volume set data to a spare storage device after a device failure, on-line expansion of a volume set, volume set parity checking, snapshot backup, volume set initialization, etc. Typically, in a dual active controller system, one controller acts as the master performing the task itself while locking the affected data to prevent access by the slave, or while holding the slave controller in reset during the task, and continuing to perform its primary mission of servicing user I/O requests. However, the performance of the system is diminished because of the time allotted to the primary controller to execute the task.

It is desirable to provide a method and apparatus wherein a volume set of storage devices are able to be expanded without taking the storage devices off line. It is also desirable for the data stored in the storage devices to be continuously accessible by multiple controllers during a volume set expansion. It is further desirable for data being expanded to be accessible to multiple controllers in at least some form during the data expansion process. It is desirable to provide a multi-controller relationship that permits data access to multiple controllers continuously and simultaneously during a volume storage device set expansion.

It can be seen that there is a need for a method and apparatus for using cache coherency locking to facilitate on-line volume expansion in a multi-controller storage system.

SUMMARY OF THE INVENTION

To overcome the limitations in the prior art described above, and to overcome other limitations that will become apparent upon reading and understanding the present specification, the present invention discloses a method and apparatus for using cache coherency locking to facilitate on-line volume expansion in a multi-controller storage system.

The present invention solves the above-described problems by providing a method and apparatus wherein a volume set of storage devices is able to be expanded without taking the storage devices off line. The data stored in the storage devices, except for a segment being expanded, is continuously accessible to multiple controllers during the volume set expansion.

A method in accordance with the principles of the present invention includes dividing a volume set into segments by a first controller, acquiring by the first controller a cache lock for one of the segments of the volume set to be expanded and providing a second controller access to any non-cache-locked segments of data during the expansion while safeguarding integrity of the segment undergoing expansion.

In another embodiment of the present invention a storage subsystem is provided. The storage system includes a plurality of storage devices, a backplane adapted to couple to said plurality of storage devices and a plurality of controllers, coupled to the backplane, for controlling the plurality of storage devices, the plurality of controllers having a first interface to couple to a host system and a second interface adapted to couple to said backplane to communicate with said plurality of storage devices, wherein a first controller of the plurality of controllers divides a volume set into segments and acquires a cache lock for one of the segments of the volume set to be expanded, and wherein a second controller is provided access to any non-cache-locked segments of data during the expansion while the first controller safeguards integrity of the segment undergoing expansion.

In another embodiment of the present invention an article of manufacture comprising a program storage medium readable by a computer is provided. The medium tangibly embodying one or more programs of instructions executable by the computer to perform a method for using cache coherency locking to facilitate on-line volume expansion in a multi-controller storage device, the method including dividing a volume set into segments by a first controller, acquiring by the first controller a cache lock for one of the segments of the volume set to be expanded and providing a second controller access to any non-cache-locked segments of data during the expansion while safeguarding integrity of the segment undergoing expansion.

In another embodiment of the present invention a mass storage controller system is provided. The mass storage system includes a plurality of storage means, backplane means adapted to couple to said plurality of storage means and a plurality of controller means, coupled to the backplane means, for controlling the plurality of storage means, the plurality of controller means having a first interface to couple to a host means and a second interface adapted to couple to said backplane means to communicate with said plurality of storage means, wherein a first controller means of the plurality of controller means dividing a volume set into segments and acquires a cache lock for one of the segments of the volume set to be expanded, and wherein a second controller means is provided access to any non-cache-locked segments of data during the expansion while safeguarding integrity of the segment undergoing expansion.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 6a–d illustrate the expansion process according to one embodiment of the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for using cache coherency locking to facilitate online volume expansion in a multi-controller storage system. One controller of the multi-controller system may be designated the primary controller for carrying out the volume expansion. The primary controller makes a backup copy of a proposed segment of data prior to the segment undergoing expansion to protect the integrity of the data to be expanded. A first controller communicates to the other controllers the parameters of the expansion and the segment of the volume being expanded. A second controller is prevented from accessing a segment of a volume set that is undergoing expansion. The first controller also provides the second controller information regarding the expansion so that the second controller may, in the event the first controller fails, perform the expansion using a backup copy of the segment being expanded.

Figure 1:
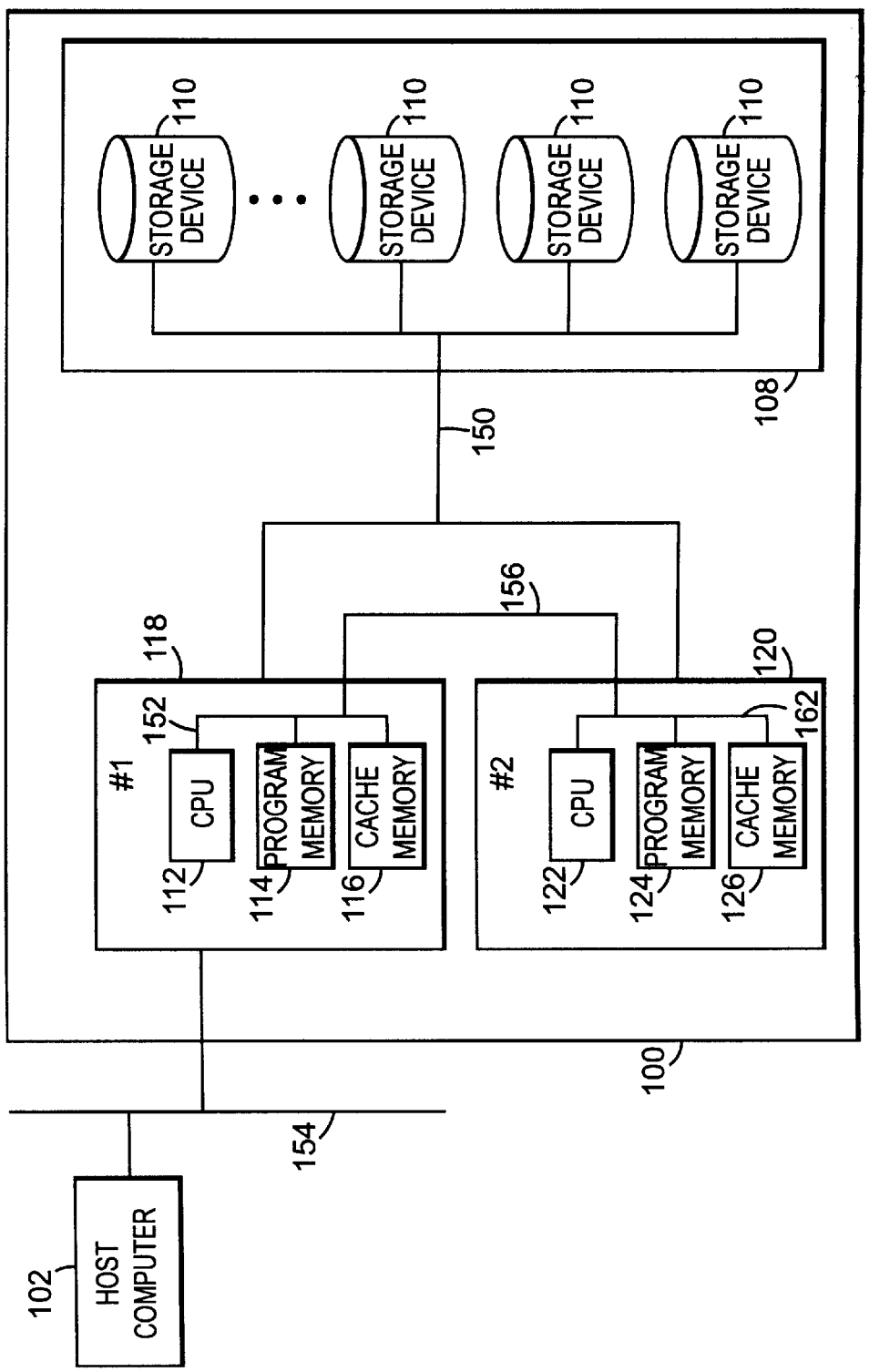
FIG. 1 illustrates a block diagram of a typical RAID storage subsystem, having multiple active storage system controllers, in which the methods and associated apparatus of the present invention may be applied.

FIG. 1 illustrates a block diagram of a typical RAID storage subsystem 100, having multiple active storage system controllers 118 and 120, in which the methods and associated apparatus of the present invention may be applied. RAID storage subsystem 100 includes at least one pair of multiple active storage system controllers 118 and 120 that are in turn connected to storage system 108 via bus (or busses) 150 and to host computer 102 via bus 154. In FIG. 1, storage system 108 is, for example, comprised of a plurality of storage devices 110. One of ordinary skill in the art will readily recognize that interface bus 150 between the multiple active storage device controllers 118 and 120 and storage system 108 (including storage devices 110) may be any of several industry standard interface busses including SCSI, IDE, EIDE, IPI, Fiber Channel, SSA, PCI, etc. Circuits (not shown) within multiple active storage device controllers 118 and 120 appropriate to controlling bus 150 are well known to those of ordinary skill in the art. Interface bus 154 between multiple active storage device controllers 118 and 120 and host computer 102 may any of several standard industry interface busses including SCSI, Ethernet (LAN), Token Ring (LAN), etc. Circuits (not shown) within multiple active storage device controllers 118 and 120 appropriate to controlling bus 154 are well known to those of ordinary skill in the art.

As shown in FIG. 1, RAID storage subsystem 100 may be utilized to implement any of the well-known RAID levels (e.g. levels 0–5). The various RAID levels are distinguished by the manner in which the associated RAID controller logically subdivides or partitions the storage devices 110 in storage system 108. For example, when implementing RAID level 1 features, approximately half of the storage devices 110 of storage system 108 are used to store and retrieve data while the other half is operated by the RAID controller to mirror the data storage contents of the first half. Further, when implementing RAID level 4 features, the RAID controller utilizes a portion of the storage devices 110 in storage system 1083 for the storage of data and the remaining storage devices 110 are utilized for the storage of error checking/correcting information (e.g. parity information). The methods and associated apparatus of the present invention may be applied to the RAID storage subsystem 100 in conjunction with any of the standard RAID levels.

Active controller 118 may include CPU 112, program memory 114 (e.g. ROM/RAM devices for storing program instructions and variables for the operation of CPU 112), and cache memory 116 for storing data and control information related to the data stored in storage system 108. CPU 112, program memory 114, and cache memory 116 may be coupled via memory bus 152 to enable CPU 112 to store and retrieve information in the memory devices. The data structures of the present invention are embodied within cache memory 116 and are created and manipulated by methods operable within CPU 112. Active controller 120 is identical to active controller 118 and may also include CPU 122, program memory 124 and cache memory 126, all interconnected via memory bus 162.

To permit each of the multiple active controllers 118, 120 to communicate with the other, the multiple active storage device controllers 118 and 120 are interconnected via shared bus 156. The multiple active storage device controllers 118 and 120 are interchangeable devices within RAID subsystem 100 to permit easy replacement, including hot swap, of a defective controller. One of ordinary skill in the art will readily recognize that the block diagram of FIG. 1 is intended only as an exemplary design which may embody the present invention. Many alternate controller and subsystem designs may embody the methods and associated apparatus and structures of the present invention.

Each CPU 112 or 122 within each active controller 118 or 120 can manipulate the cache memory 116 or 126 of the other controller via shared bus 156. The active controllers 118, 120 may be utilized in several modes depending upon software and control methods operable within CPU 112 and 122. In the dual-active controller pair mode of operation, each cache memory 116 and 126 is logically subdivided by control methods operable within the CPUs 112 and 122 into a first section for use by the corresponding CPU (attached through their respective memory bus 152 and 162) and a second section for use by the alternate controller (via shared bus 156).

In the dual-active controller pair mode, each of the pair of multiple active storage device controllers 118 and 120 is active in parallel with the other to maintain cache information in its own cache as well as the cache of the alternate controller. Each controller may control its own particular volume sets (storage device groups within storage system 108).

In all modes of operation of multiple controller systems, cache memories contain signature data which associate the cache memory contents with a particular RAID subsystem. A controller having a cache memory the content of which is associated with the RAID subsystem in which it is presently operating, as determined by a match of the signature information, is referred to herein as a "native" controller. Conversely, a controller having a cache memory the content of which is not associated with the RAID subsystem in which it is presently operating, as determined by a mismatch of the signature information, is referred to herein as a "foreign" controller.

The above-mentioned fault tolerant data protection schemes employed in storage arrays, also provide a means for rebuilding a physical replacement storage device should one of the main physical storage devices of the storage array fail. The remaining main storage devices of the array provide the information necessary to rebuild the physical replacement drive from the remaining storage device. For a RAID 1 system, the physical replacement device can be rebuilt from the failed storage device's mirrored storage device. For a RAID 4 or RAID 5 system, a logical block on the replacement device is rebuilt by XORing the other logical blocks of its stripe, and this process is repeated until all logical blocks of the replacement storage device are rebuilt.

Volume set rebuild methodologies in a dual active controller environment may assign the rebuild task to a single controller. For example, in a dual active controller system, one controller acts as the master performing a task by itself while locking the affected data to prevent access by the slave, or by holding the slave controller in reset during the task and continuing to perform its primary mission of servicing user I/O requests. This master controller performs the task in tandem with its mission task of performing user input/output operations.

However, the performance of the system is diminished because of the time allotted to the primary controller to perform the task. For example, during the rebuild operation, the performance of this controller is decreased because of the time allotted to the rebuild function, and the duration of the rebuild is lengthened due to the concurrent I/O. The slave controller's performance is not appreciably affected by this activity and the slave controller may, in fact, be completely idle at any time during the rebuild thereby wasting processing resources. Moreover, other tasks must also be performed by the primary controller, e.g., event logging, seek sorting and other cache management.

Figure 2:
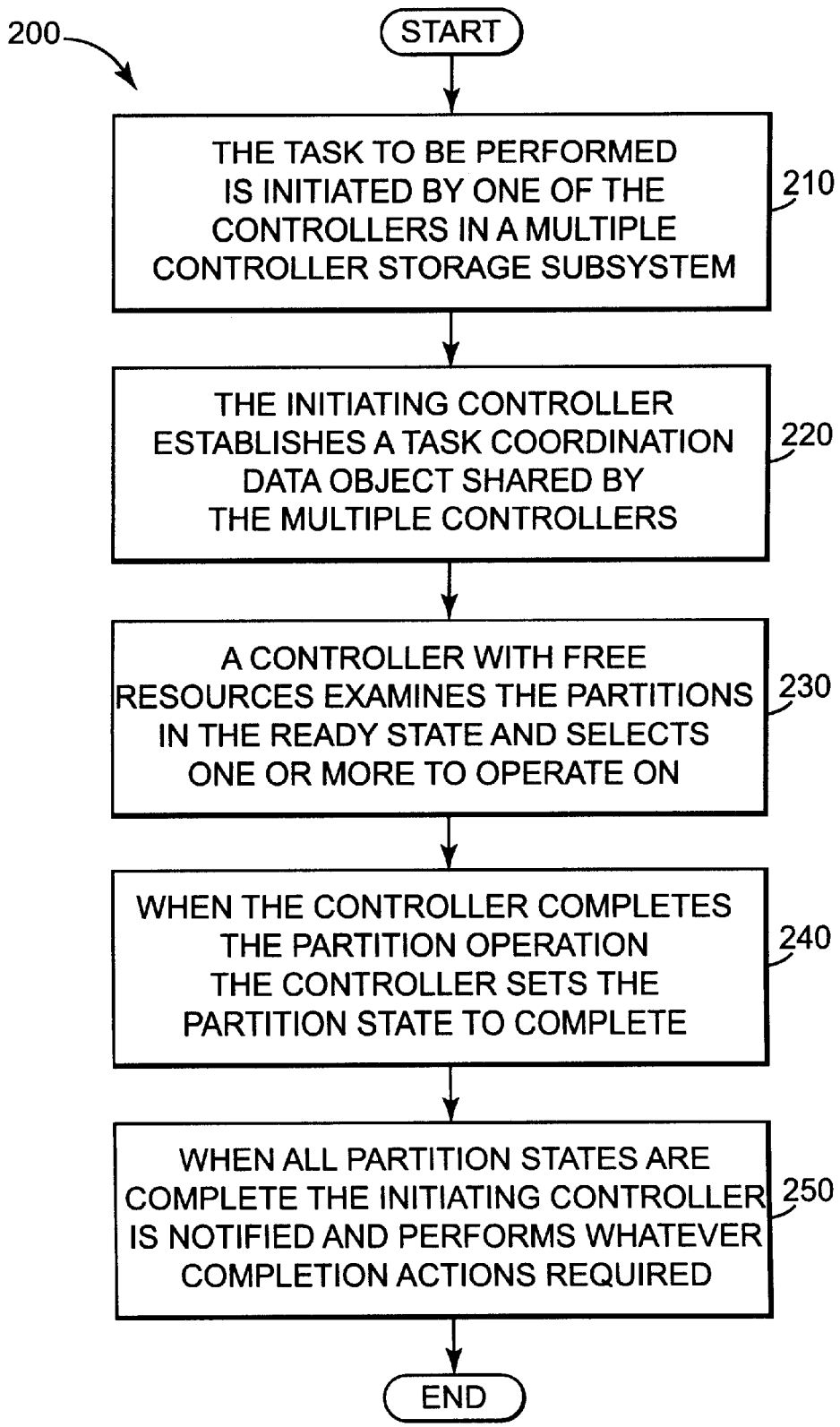
FIG. 2 illustrates a flow chart of the method for cooperative distributed task management in a storage subsystem with multiple controllers using cache locking according to the present invention.

Thus, according to the present invention, a method and apparatus for using cache coherency locking to facilitate on-line expansion in a multi-controller storage device is disclosed. FIG. 2 illustrates a flow chart of the method for cooperative distributed task management in a storage subsystem with multiple controllers using cache locking according to the present invention. The task to be performed is initiated by one of the controllers in a multiple controller storage subsystem 210. The initiating controller establishes a task coordination data object shared by the multiple controllers 220. The subject task represented by the task coordination object is decomposed into discrete partitions representing discrete portions of the task that may be performed, for example, independently by any of a plurality of controllers in the storage subsystem. The task coordination object thus includes information about the task to be performed and the partitions that make up the task. The information for each task partition includes a state variable that indicates whether the partition is READY, IN PROGRESS, or COMPLETE. Thus, the controllers use a semaphore-mechanism to ascertain the state of individual partitions and to acquire control over the partitions.

A controller with free resources examines the partitions in the READY state and selects one or more to operate on 230. During the operations, the partition is in the IN PROGRESS state. When the controller completes the partition operation the controller sets the partition state to COMPLETE 240.

When all partition states are complete the initiating controller is notified and performs whatever completion actions required 250, e.g. notification to an operator. In this fashion the controllers cooperate in the execution of the task, each controller performing steps of task independently of the other at whatever rate it is capable. In addition to state information, the partition shared data object may include information about the operation to be performed and the data set to be operated on.

Shared multiple raid controller access to common storage devices needs to be coordinated. In a system that includes a plurality of RAID control modules connected to a common shared LUN, each of a plurality of RAID controllers may actively process different I/O requests on a common shared subset of storage devices. One controller may be designated as primary with respect to a particular shared subset of storage devices. The plurality of RAID controllers may then exchange messages over a communication medium to coordinate concurrent access to the shared subset of storage devices through the primary controller. The messages exchanged may include semaphore lock and release requests to coordinate exclusive access during critical operations as well as cache and meta-cache data to maintain cache coherency between the plurality of the RAID controllers with respect to the common shared subset of storage devices. These messages may be exchanged via any of several well known communication mediums, including, a shared memory common to the plurality of controllers; and the communication bus connecting the shared subset of storage devices to each of the plurality of controllers.

According to the present invention, cache synchronization is used to maintain data integrity while performing the non-I/O tasks distributed across multiple controllers. One possible mechanism to provide cache synchronization is a software-based cache locking mechanism as described above. Shared data objects for the partitioned task management therefore may use a cache synchronization mechanism to maintain data integrity while executing the task partition.

Figure 3:
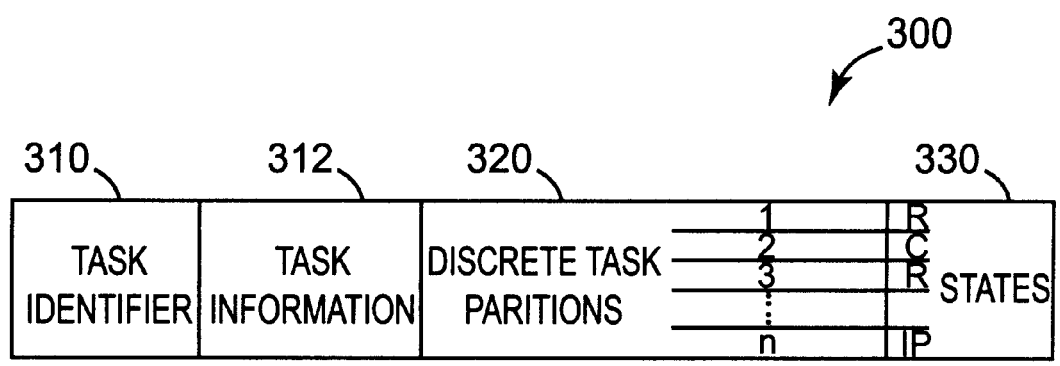
FIG. 3 illustrates one embodiment of a task coordination data object according to the present invention.

FIG. 3 illustrates one embodiment of a task coordination data object 300 according to the present invention. In FIG. 3, the task coordination data object includes a task identifier 310. Associated with a task identifier is task information 312 and discrete task partitions 320 representing discrete portions of the task that may be performed independently by any of a plurality of the system controllers. For each of the task partitions, state information 330 is provided to indicate whether a task partition is in a READY, IN PROGRESS, or COMPLETE state.

According to the present invention, a first controller of the multi-controller system is designated for carrying out the volume expansion. The first controller makes a backup copy of a proposed segment of the volume set to be expanded.

The first controller communicates to the other controllers the parameters of the expansion and the segment of the volume being expanded. Secondary controllers are prevented from accessing a segment of the volume set that is undergoing expansion. Data integrity is preserved by maintaining a mirrored backup copy of each segment of the volume set being manipulated.

Accordingly, the present invention is not meant to be limited to any particular modes of operation of multiple controller systems, such as dual active controller systems and is practicable in systems having any number of controllers and any number of storage devices or storage device sets. Further, the present invention is not meant to be limited to any type of data storage system, i.e., disk, tape, etc.

Figure 4:
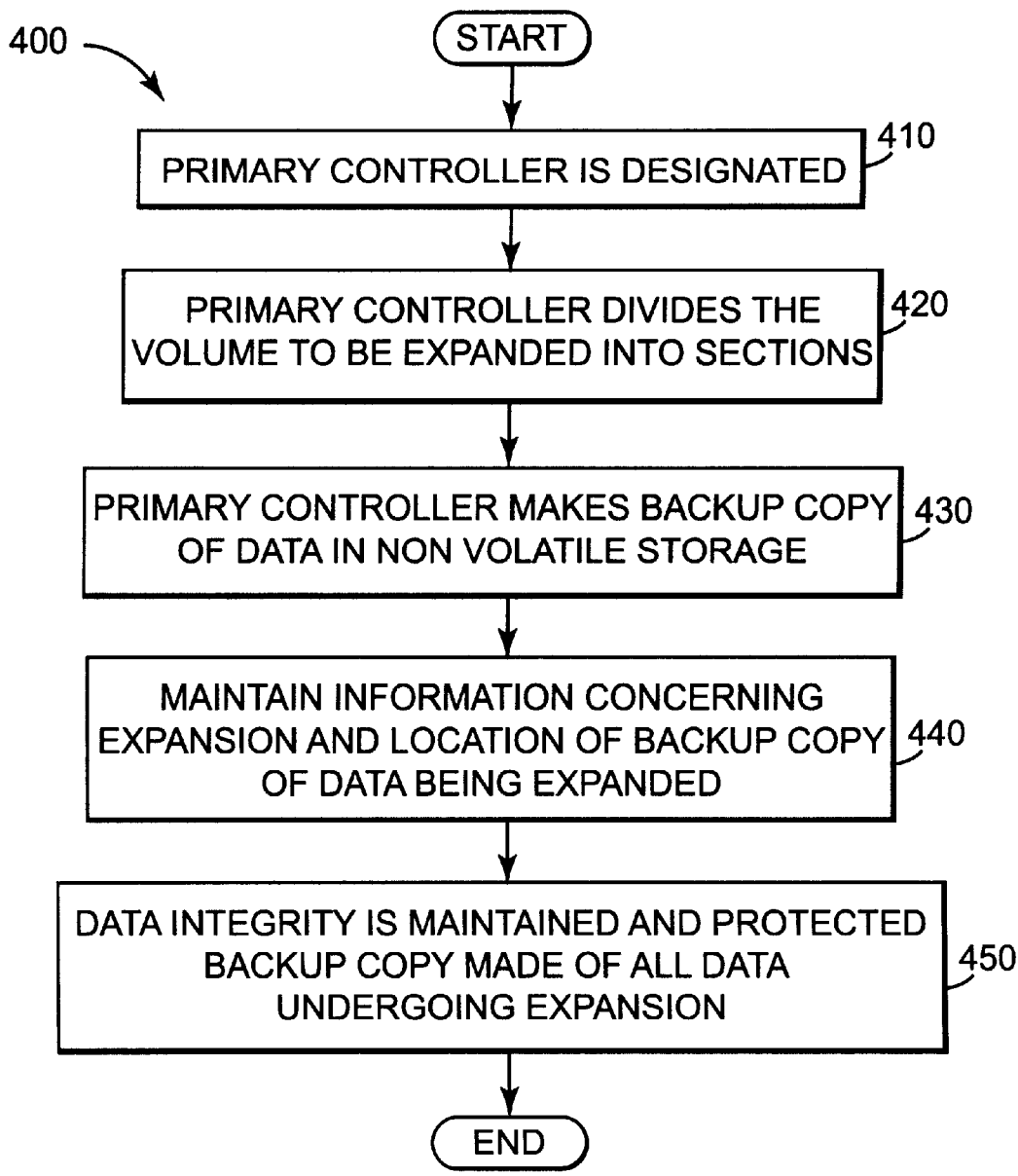
FIG. 4 is a flowchart of the method for expanding a plurality of storage devices according to the present invention.

FIG. 4 illustrates a flow chart of the method for dynamic volume expansion 400. In FIG. 4, a method to dynamically expand an on-line virtual storage volume 400 is disclosed. One controller of the multi-controller system is designated the primary controller for the purpose of coordinating and carrying out the volume set expansion 410. The primary controller performing the volume expansion divides the volume to be expanded into segments 420. Prior to expanding a segment, the first controller copies the data to a backup area in a non-volatile storage 430. Information about the expansion and the location of the backup data are maintained in non-volatile memory 440 and is therefore accessible to all controllers. In the event that there is an interruption of the expansion, due to for instance, a power failure, no user data is lost, because all the data undergoing expansion has been backed up and safely stored in non-volatile storage 450.

Figure 5:
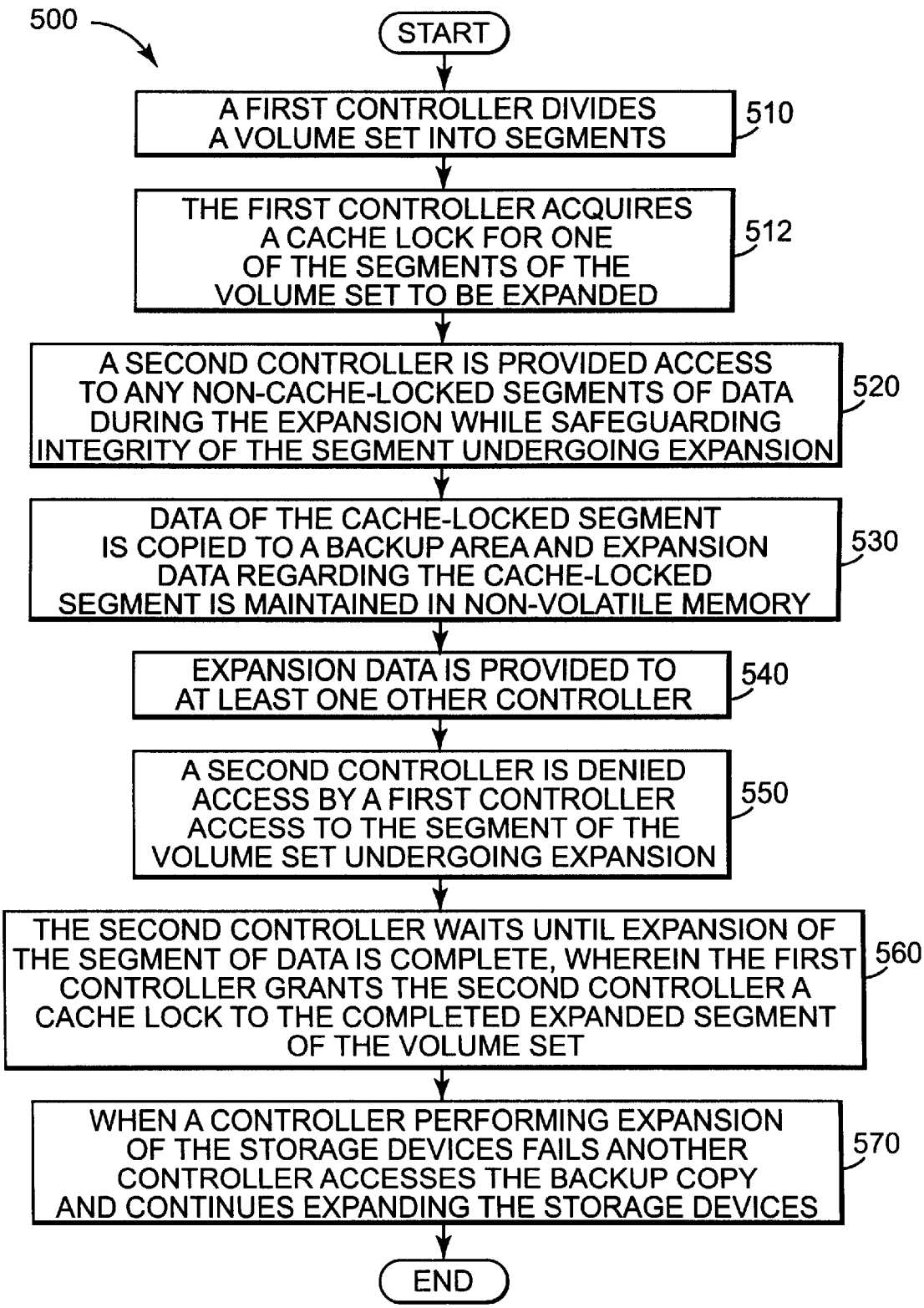
FIG. 5 is a flowchart of the method for using cache coherency locking to facilitate on-line volume expansion in a multi-controller storage system.

FIG. 5 illustrates a flow chart of the method for using cache coherency locking to facilitate on-line volume expansion in a multi-controller storage system 500. In FIG. 5, a first controller divides a volume set into segments 510. The first controller acquires a cache lock for one of the segments of the volume set to be expanded 512. A second controller is provided access to any non-cache-locked segments of data during the expansion while safeguarding integrity of the segment undergoing expansion 520. Data of the cache-locked segment is copied to a backup area and expansion data regarding the cache-locked segment is maintained in non-volatile memory 530. Expansion data is provided to at least one other controller 540. The expansion data includes information regarding the segment of the volume set undergoing expansion and the location of a backup of the segment of the volume set undergoing expansion. A second controller is denied access by a first controller access to the segment of the volume set undergoing expansion 550. The second controller waits until expansion of the segment of data is complete, wherein the first controller grants the second controller a cache lock to the completed expanded segment of the volume set 560. When a controller performing expansion of the storage devices fails another controller accesses the backup copy and continues expanding the storage devices 570.

FIGS. 6a–d illustrate the expansion process according to one embodiment of the present invention. FIG. 6a shows the start of the expansion. In FIG. 6a, no data has been expanded so expanding overwrites unexpanded data. FIG. 6b shows that the data that may be overwritten in section 1 608 is stored at the end of the new disks 610. FIG. 6b also shows how the expanded data is laid out 612.

FIG. 6c shows how the expansion proceeds with section 2 620. The expansion again overwrites unexpanded data so the unexpanded data is first saved at the end of the new disks 622. FIG. 6c also shows how the expanded data is laid out 624. FIG. 6d shows the expansion of section 3 630. The expansion of section 3 writes over data that has been previously converted to the expanded format 632 so there is no need to save the unexpanded data at the end of the new disks. FIG. 6d also shows how the expanded data is laid out 634.

At this point both section 4 640 and section 5 642 may be expanded without overwriting unexpanded data. The primary controller may allow the secondary controllers to assist in the expansion process. For example, the secondary controllers may assist in the expansion process according to the method described in co-pending and commonly-assigned U.S. Patent Application, entitled METHOD AND APPARATUS FOR COOPERATIVE DISTRIBUTED TASK MANAGEMENT IN A STORAGE SUBSYSTEM WITH MULTIPLE CONTROLLERS USING CACHE LOCKING" to Pare et al., having U.S. patent application Ser. No. 10/084,214, which is hereby incorporated herein by reference in their respective entirety.

Both the task of expanding section 4 and the task of expanding section 5 are moved to the READY state and any of the controllers may execute the expansion for these sections using cache locks to coordinate access to the data. As more data is expanded the number of sections that become READY grows. When the expansion is completed through section 6 650 then sections 7 652, 8 654, 9 656 and 10 658 are moved to the READY state.

Figure 7:
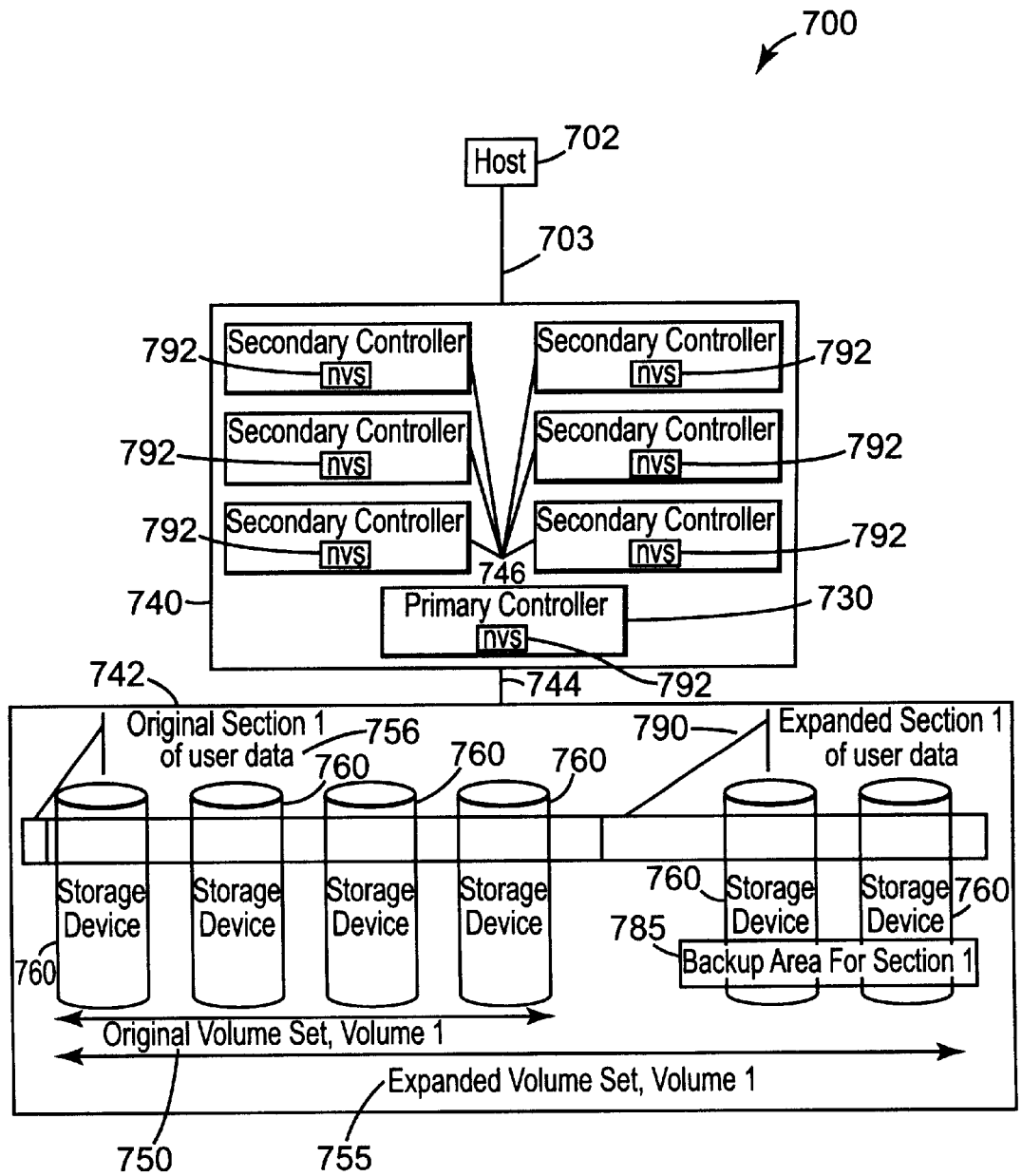
FIG. 7 is a block diagram illustrating a computing system according to the present invention.

FIG. 7 is a block diagram of a multi-controller multi-disk system 700. In FIG. 7, the method for using cache coherency locking to facilitate on-line volume expansion in a multi-controller storage system is explained. FIG. 7 shows a host 702 coupled to a plurality of controllers 740 through a host/controller interface 703. The plurality of controllers are coupled to a storage system 742 through a storage system/controller interface 744. A multi-disk volume set is expanded using a first controller 730 in the multi-controller system 710.

The other controllers 746 may be independently performing functions, executing programs instructions and other instructions in a capacity, such that with regard to the other functions and programs, the other controllers 746 are the primary controllers for the functions that they are carrying out independently.

The first controller 730 of the multi-controller system 740 begins a volume set expansion 755 of an original volume set 750 by dividing the volume set 750 into segments 756 and making a backup copy 785 of a data segment 756 to be expanded. The original volume set 750 is stored in a plurality of storage devices 760. For purposes of explanation, four storage devices 760 are shown for the original volume set 750 in FIG. 7, however any number of storage devices 760 may be in the original volume set 750. Volume expansion 755 is carried out one segment at a time. However, a segment of the volume set to be expanded 756 may include numerous blocks of data from a plurality of individual storage devices 760 simultaneously.

The first controller 730 acquires a cache lock that covers all of the data in all of the data blocks that make up the initial segment 756 to be expanded. Data remaining in subsequent segments of the original volume set 750 of storage devices 760 is maintained in its original data format. The remaining data, that is, data in all other data blocks in all other storage devices 760 that are not involved with the present expansion, is accessible to the other controllers 746 in the multi-controller system 740 using cache locking procedures used during normal operation, i.e., when a volume expansion 755 is not taking place. However, the other controllers 746 will not be able to access data contained in the segment 756 under expansion while the first controller 730 is performing the volume expansion 755 on that segment 756.

The other controllers 746 have no need for knowledge concerning the mechanisms taking place on the segment 756 being expanded. When a second controller 746 desires to access data of the segment 756 being expanded, the second controller 746 requests a cache lock for the data from the first controller 730. However, the first controller 730 does not grant the cache lock. The second controller 746 is instead directed to wait. When the expansion of the segment 756 is completed, the second controller 746 is then granted a cache lock, i.e., the other controller 746 is granted access to the data which after expansion exists in the expanded format 790.

At the start of the volume expansion process, the first controller 730 informs the other controllers 746 of the expansion operation parameters and which segment 756 of the volume set 750 is currently undergoing expansion. Both the first 730 and second controller 746 retain this information in nonvolatile storage 792, which may be a part of each controller as shown in FIG. 7, or which may be provided separate from each controller. In the event that the first controller 730 should fail during the expansion operation 755, a second controller 746 is able to determine the location of the backup copy 785 of the proposed expansion segment 756 and complete the expansion operation 755 by starting over using the backup copy of the data 785. Thus, the reliability of the system is enhanced and data integrity is safeguarded through provision of the backup copy 785.

Figure 8:
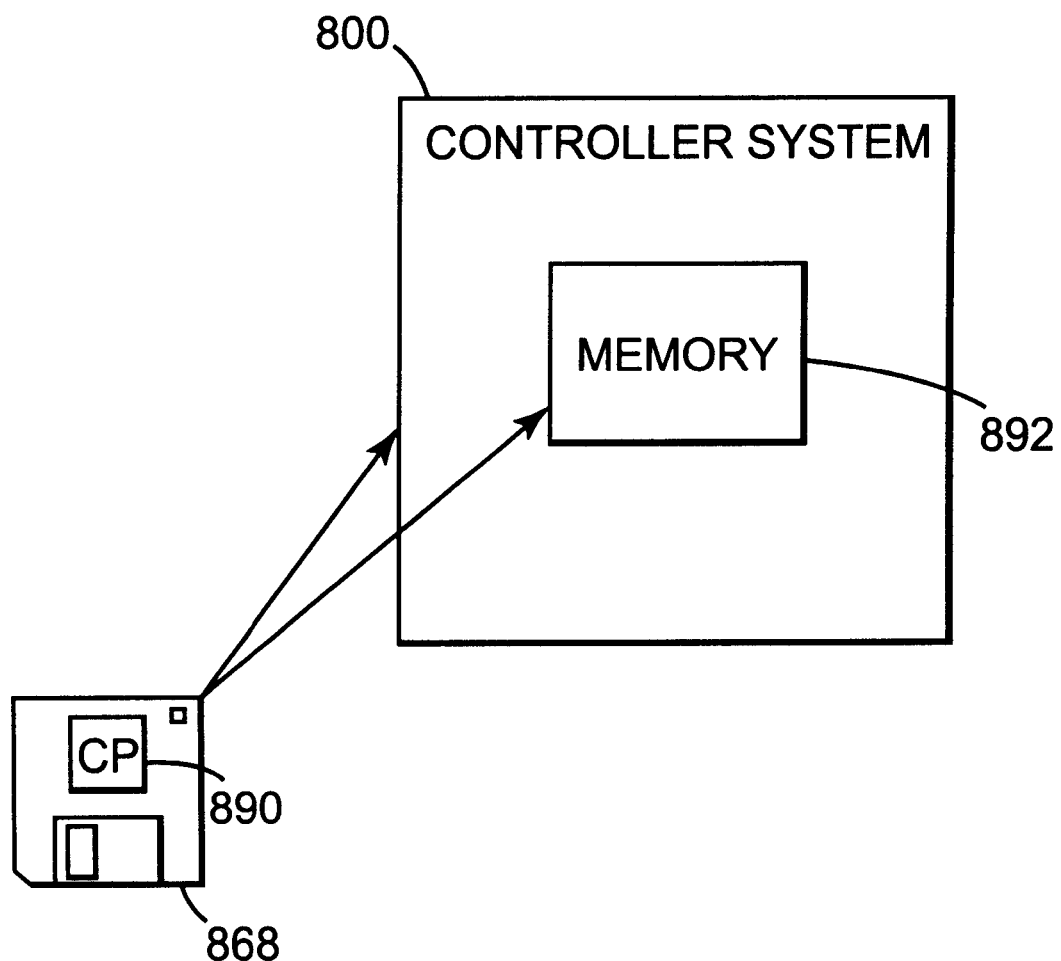
FIG. 8 illustrates a controller system according to the present invention, wherein the process illustrated with reference to FIGS. 2–6 may be tangibly embodied in a computer-readable medium or carrier.

FIG. 8 illustrates a controller system 800 according to the present invention, wherein the process illustrated with reference to FIGS. 2–7 may be tangibly embodied in a computer-readable medium or carrier, e.g. one or more of the fixed and/or removable data storage devices 868 illustrated in FIG. 8, or other data storage or data communications devices. A computer program 890 expressing the processes embodied on the removable data storage devices 868 may be loaded into the memory 892 or into the controller system 800, e.g., in a processor (not shown), to configure the controller system 800 of FIG. 8, for execution. The computer program 890 comprise instructions which, when read and executed by the controller 800 of FIG. 8, causes the controller system 800 to perform the steps necessary to execute the steps or elements of the present invention.

In summary, the present invention provides a method and apparatus for using cache coherency locking to facilitate on-line volume expansion in a multi-controller storage device. One controller of the multi-controller system is designated the primary controller for carrying out the volume expansion. The primary controller makes a backup copy of each proposed segment of the volume set to be expanded, prior to expansion thereof.

The primary controller communicates to the other controllers the parameters of the expansion and the segment of the volume being expanded. Secondary controllers are prevented from accessing a segment of the volume set that is undergoing expansion, but are directed instead to the backup copy of the segment undergoing expansion. The primary controller grants access to data through granting a cache lock to a secondary controller that temporarily grants exclusive access of the secondary controller to the data.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for using cache coherency locking to facilitate on-line volume expansion in a multi-controller storage device, comprising:

dividing a volume set into segments by a first controller;

acquiring by the first controller a cache lock for one of the segments of the volume set to be expanded; and providing a second controller access to any non-cache-locked segments of data during the expansion while safeguarding integrity of the segment undergoing expansion, wherein the integrity of the data stored in the storage devices undergoing expansion being safeguarded comprises, prior to expansion of the cache-locked segment of the volume set, copying data of the cache-locked segment to a backup area and maintaining expansion data regarding the cache-locked segment in non-volatile memory and wherein the integrity of the data stored in the storage devices undergoing expansion being safeguarded further comprises making known to a second controller the expansion data.

2. The method of claim 1, wherein expansion data comprises information regarding the segment of the volume set undergoing expansion and the location of a backup of the segment of the volume set undergoing expansion.

3. The method of claim 2, wherein the integrity of the data stored in the storage devices undergoing expansion being safeguarded further comprises when a controller performing expansion of the storage devices fails another controller accesses the backup copy and continues expanding the storage devices.

4. The method of claim 1, further comprising denying to a second controller by a first controller access by the second controller to the segment of data undergoing expansion, the second controller waiting until expansion of the segment of data is complete, wherein the first controller grants the second controller a cache lock to the completed expanded segment of the volume set.

5. A storage subsystem, comprising:

a plurality of storage devices;

a backplane adapted to couple to said plurality of storage devices; and a plurality of controllers, coupled to the backplane, for controlling the plurality of storage devices, the plurality of controllers having a first interface to couple to a host system and a second interface adapted to couple to said backplane to communicate with said plurality of storage devices;

wherein a first controller of the plurality of controllers divides a volume set into segments and acquires a cache lock for one of the segments of the volume set to be expanded, and wherein a second controller is provided access to any non-cache-locked segments of data during the expansion while the first controller safeguards integrity of the segment undergoing expansion, wherein the first controller maintains integrity of the data stored in the storage devices undergoing expansion being safeguarded by, prior to expansion of the cache-locked segment of the volume set, copying data of the cache-locked segment to a backup area and maintaining expansion data regarding the cache-locked segment in non-volatile memory and wherein the first controller maintains integrity of the data stored in the storage devices undergoing expansion being safeguarded by making known to a second controller the expansion data.

6. The storage subsystem of claim 5, wherein expansion data comprises information regarding the segment of the volume set undergoing expansion and the location of a backup of the segment of the volume set undergoing expansion.

7. The storage subsystem of claim 6, wherein, when the first controller fails, a second controller accesses the backup copy of the segment of the volume set undergoing expansion and continues performing the volume expansion of the segment that was undergoing expansion by the first controller.

8. The storage subsystem of claim 5, wherein the first controller denies access by a second controller to the segment of data undergoing expansion, the second controller waiting until expansion of the segment of data is complete, wherein the first controller grants the second controller a cache lock to the completed expanded segment of the volume set.

9. An article of manufacture comprising a program storage medium readable by a computer, the medium tangibly embodying one or more programs of instructions executable by the computer to perform a method for using cache coherency locking to facilitate on-line volume expansion in a multi-controller storage device, the method comprising:

dividing a volume set into segments by a first controller:

acquiring by the first controller a cache lock for one of the segments of the volume set to be expanded; and providing a second controller access to any non-cache-locked segments of data during the expansion while safeguarding integrity of the segment undergoing expansion, wherein the integrity of the data stored in the storage devices undergoing expansion being safeguarded comprises, prior to expansion of the cache-locked segment of the volume set, copying data of the cache-locked segment to a backup area and maintaining expansion data regarding the cache-locked segment in non-volatile memory and wherein the integrity of the data stored in the storage devices undergoing expansion being safeguarded further comprises making known to a second controller the expansion data.

10. The article of manufacture of claim 9, wherein expansion data comprises information regarding the segment of the volume set undergoing expansion and the location of a backup of the segment of the volume set undergoing expansion.

11. The article of manufacture of claim 10, wherein the integrity of the data stored in the storage devices undergoing expansion being safeguarded further comprises when a controller performing expansion of the storage devices fails another controller accesses the backup copy and continues expanding the storage devices.

12. The article of manufacture of claim 9, further comprising denying to a second controller by a first controller access by the second controller to the segment of data undergoing expansion, the second controller waiting until expansion of the segment of data is complete, wherein the first controller grants the second controller a cache lock to the completed expanded segment of the volume set.

* * * * *